United States Patent [19]

Fujimura et al.

[11] 4,291,549
[45] Sep. 29, 1981

[54] METHOD OF DISPERSING A LIQUID INTO ANOTHER LIQUID

[75] Inventors: Kensuke Fujimura; Naomichi Yamamoto; Masahiro Ogawa; Nobuyoshi Tanigawa, all of Ube, Japan

[73] Assignee: Ube Industries, Ltd., Japan

[21] Appl. No.: 105,014

[22] Filed: Dec. 19, 1979

[30] Foreign Application Priority Data

Feb. 7, 1979 [JP] Japan .................................. 54-12277

[51] Int. Cl.$^3$ ............................................. B01D 9/04
[52] U.S. Cl. ..................................... 62/534; 366/169
[58] Field of Search ................................... 62/533–535, 62/68–70, 74, 306, 307, 347; 222/144; 366/168, 169, 172, 173, 176; 210/208, 219, 220, 221 P; 202/236; 203/90; 208/359; 196/128

[56] References Cited

U.S. PATENT DOCUMENTS 1,166,319 12/1915 Blichfeldt ........................... 366/169
2,402,905 6/1946 Miller ................................. 366/169

Primary Examiner—Frank Sever
Attorney, Agent, or Firm—McGlew and Tuttle

[57] ABSTRACT

A hollow, rotating drum is horizontally supported in a vessel or crystallizer containing a brine such as sea water and has a plurality of nozzles projecting radially outwardly therefrom and having orifices having a smaller diameter than the nozzles. A liquified refrigerant is introduced through a conduit and a hollow shaft into the drum and is discharged as droplets into the brine while the drum is being rotated at high speeds in the brine. Upon getting into the brine, the refrigerant is vaporized and takes away heat of the brine, which is then refrigerated to form small crystals of ice.

3 Claims, 4 Drawing Figures

METHOD OF DISPERSING A LIQUID INTO ANOTHER LIQUID

BACKGROUND OF THE INVENTION

1. Field of the Invention:

The present invention relates generally to a method of dispersing a liquid into another liquid and more particularly to a method of dispersing a refrigerant into a brine so as to produce solid crystals from the brine.

2. Prior Art:

Sea water desalination plants using the direct freezing method employ a crystallizer as the process vessel. This method and apparatus has not been found satisfactory notwithstanding various attempts to improve its structure and performance. The crystallizer contains sea water, the brine, with which a refrigerant, such as butane, is brought into direct contact for an increased degree of heat exchange. A conventional structure for such a crystallizer is illustrated in FIG. 1 of the accompanying drawings. A crystallizer 1 includes a pipe 2, fixedly disposed in a lower portion thereof and having a plurality of small holes 3 which open upwardly. The crystallizer 1 contains a brine 4 supplied from a supply pipe 5. A refrigerant is introduced through a conduit 6 into the pipe 2 and is ejected from the holes 3 into the brine 4. The ejected refrigerant is vaporized as it takes heat away from the brine 4, which is then refrigerated to form crystals of ice. The vaporized refrigerant moves upwardly and is discharged through a discharge pipe 7. The crystals of ice thus produced are discharged by a slurry discharge pipe 8.

To refrigerate the brine and produce crystals of ice effectively, it is necessary that the refrigerant be dispersed in as small droplets as possible into the brine to get a greater area of exposure to, or contact with, the brine for an increased degree of heat exchange therewith. In addition, the temperature and density of the brine in the crystallizer should be as uniform as possible.

In the prior crystallizer shown in FIG. 1, however, an attempt to make the holes 3 smaller, for smaller refrigerant droplets, would result in a greater pressure loss on the passage of the refrigerant through the holes 3. Furthermore, the refrigerant would have to be pressurized strongly for introduction into the pipe 2, and the small hole 3 would tend to get clogged.

The refrigerant discharged from the fixed holes 3 jets through the brine 4 and, when it has dispersed into droplets in the brine, the droplets tend to unite with each other. This is caused by the fact that the speed of the droplets is suddenly reduced by the resistance of the brine 4, and the droplets following in the same straight courses catch up with the first ejected droplets.

A mechanical agitator is usually added to the conventional crystallizer to get the brine 4 homogeneously stirred, but it requires a large power supply for effective stirring of the brine 4.

SUMMARY OF THE INVENTION

According to the present invention, a hollow drum is rotatably supported in a crystallizer vessel containing a brine. The drum has a plurality of nozzles projecting radially outwardly therefrom, with the nozzles having orifices of smaller diameter than the nozzles. A refrigerant is introduced through a conduit and a hollow shaft into the drum. The refrigerant is broken up into small droplets as it is dicharged from the orifices and into the brine while the drum is being rotated. The refrigerant is prevented from getting vaporized in the nozzles because of a pressure difference developed by the smaller-diameter orifices.

It is an object of the present invention to provide a method of dispersing a liquid into another liquid, with increased areas of contact established between the liquids for an increased degree of heat exchange therebetween.

A still further object of the present invention is to provide an apparatus for dispersing one liquid into another which is simple in design, rugged in construction and economical to manufacture.

The above and other objects, features and advantages of the present invention will become apparent from the following description when taken in conjunction with the accompanying drawings.

DETAILED DESCRIPTION OF THE PREFERRED EMBODIMENT

Figure 1:
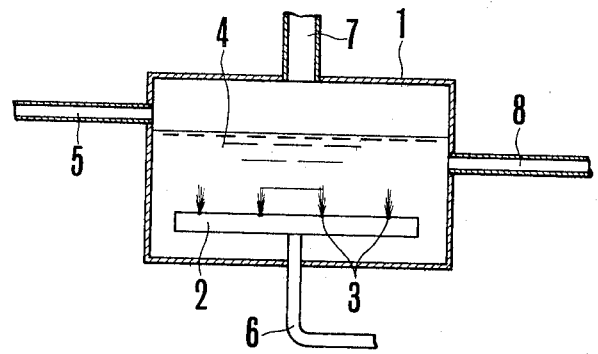
FIG. 1 is a schematic sectional view of a crystallizer apparatus according to the prior art.
Figure 2:
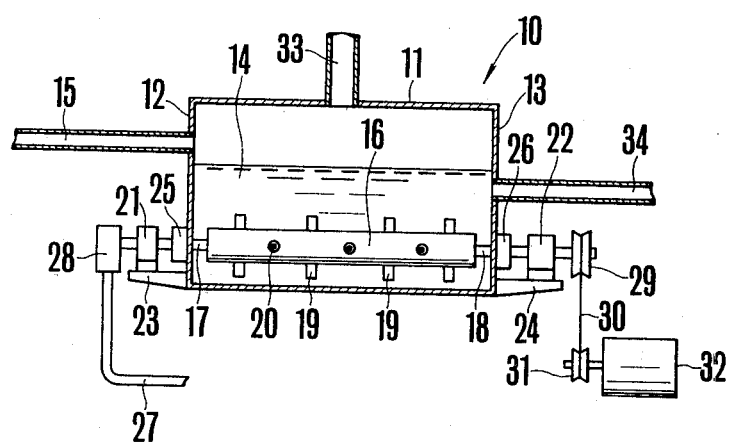
FIG. 2 is a schematic elevational view of a crystallizer apparatus constructed in accordance with the present invention.
Figure 3:
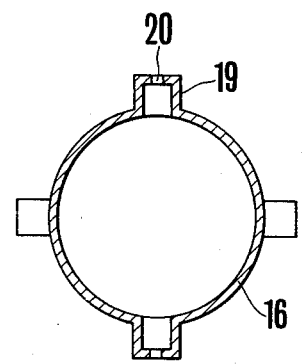
FIG. 3 is an enlarged vertical cross-sectional view of a rotating drum in accordance with the invention.

As shown in FIG. 2, a crystallizer apparatus generally indicated by the numeral 10 has a particular utility as a sea water desalination plant and comprises a crystallizer or vessel 11 having a pair of closed ends 12, 13 and containing a suitable brine 14 such as sea water, which can be supplied from a reservoir (not shown) through a supply pipe 15 attached to the vessel end 12 into the vessel 11. An elongated, rotating drum 16 is disposed at a lower position in the vessel 11 and is supported horizontally by a pair of axial shafts 17, 18 which extend rotatably through the vessel ends 12, 13, respectively. The drum 16 is hollow and has on its peripheral surface a plurality of nozzles 19 extending radially outwardly of the drum 16 as illustrated in FIG. 3. Each of the nozzles 19 communicates with the interior of the hollow drum 16 and has an orifice 20 in its free end, the orifice 20 having a diameter smaller than that of the nozzle 19 the drum and nozzles with orifices forming liquid injecting means.

The shafts 17, 18 are rotatably journaled in a pair of bearings 21, 22, respectively, that are mounted on a respective pair of brackets 23, 24 secured to the vessel 11. The shafts 17, 18 extend through a pair of seals 25, 26, respectively, attached to the respective vessel ends 12, 13 for protection against leakage of the brine 14 along the shafts 17, 18 and out of the vessel 11. The shaft 17 is hollow and is coupled in fluid communication with a conduit 27 for introducing a liquified refrigerant such as butane through a rotary joint 28. The drum 16 is rotated by a pulley 29 mounted on the shaft 18 and driven by a belt 30 running around a pulley 31 fixed to the output shaft of an electric motor 32.

In operation, the brine 14 is supplied through the pipe 15 into the vessel 11 until the drum 16 is fully submerged. The motor 32 is then energized to rotate the drum 16 at a relatively high speed, whereupon the liquified refrigerant introduced from the conduit 27 is dispersed as droplets through the orifices 20 into the brine 14. The refrigerant, upon getting into the brine 14, is vaporized as it takes heat away from the brine 14. The refrigerant as it is vaporized goes upwardly into a discharge pipe 33 attached to an upper portion of the vessel 11. The brine 14 is refrigerated by the vaporization of the refrigerant and when its temperature is lowered beyond a given point, small crystals of ice begin to develop in the vessel 11. The crystals of ice are discharged through a slurry discharge pipe 34 attached to the vessel end 13.

With such an arrangement, since the drum 16 is rotated at a relatively high speed in the brine 14, a difference in speed between the distal ends of the nozzels 19 and the brine 14 held in contact therewith is considerably large, and the refrigerant coming out of the orifices 20 is forcibly broken up into droplets, which are directed in various directions and are prevented from being united together. Accordingly, the droplets of refrigerant are small and the area of exposure to the brine 14 is considerably great, resulting in an increased degree of heat exchange between the refrigerant and the brine 14. The apparatus 10 of the present invention can form ice crystals at a greater rate of productivity. While the drum 16 is being rotated, a drop in static pressure develops at the distal ends of the nozzles 19 and causes the refrigerant in the drum 16 to be sucked out through the orifices 20. Such suction resulting from the rotation of the drum, together with centrifugal forces acting on the refrigerant, serves to reduce any pressure that is effective to force the refrigerant to be supplied into the drum 16 via the conduit 27. In some arrangements, such supplying pressurization can be dispensed with. The rate of production of ice crystals can be controlled by changing the speed of rotation of the drum 16.

The orifices 20 at the free ends of the nozzles 19 produce a pressure difference between the refrigerant in the nozzles 19 and the brine 14 for preventing the refrigerant from getting vaporized in the drum 16 and the nozzles 19. The actual size of the orifices 20 are determined in view of such a pressure difference required for preventing the vaporization of the refrigerant in the drum 16 and the nozzles 19.

Variations of the orifice size, enlargement thereof, for example, have little direct effect on the size of particles of refrigerant actually produced. More specifically, it is preferred that the droplets of refrigerant right after their dispersion into the brine 14 should have a diameter of about 0.3 m/m or less, because bubbles of vaporized refrigerant having a diameter of about 3 m/m are suitable for effective contact between the refrigerant and the brine 14. This numerical limitation is based on the fact that the ratio of the volume of the refrigerant as it is vaporized to that of the refrigerant as it is liquified is approximately 1000, and hence the diameter of a bubble of vaporized refrigerant is about 10 times larger than that of a droplet of liquified refrigerant. Conventionally, such small-sized droplets of liquified refrigerant must have been produced from extremely small diameter orifices in fixed nozzles, and thus a high degree of pressurization has been required to force the refrigerant into the nozzles. According to the present invention, however, the drum 16 is rotated at high speeds to form small drops of refrigerant and as mentioned above, no high pressurization is necessary on the refrigerant.

Figure 4:
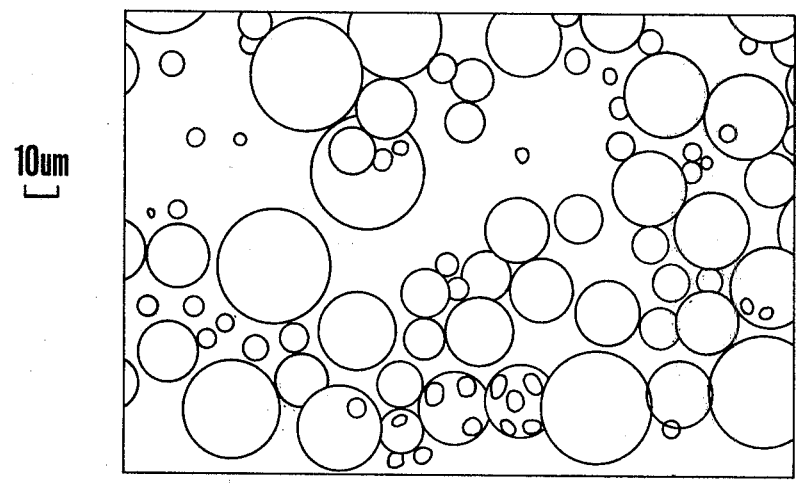
FIG. 4 is a microscopic view of a particle-laden liquid.

An experiment has been carried out using heavy oil as the brine and water as the refrigerant. Water droplets dispersed in the heavy oil have had a size of about 10 to 20 $\mu$m as shown in FIG. 4. Even under different conditions, it is believed that, upon dispersion, the refrigerant will be broken up into droplets having a size of 300 $\mu$m, or 0.3 m/m that is ten times or more the size of the water droplets as described above.

The brine 14 is stirred and homogenized sufficiently by the nozzles 19 projecting from the drum 16 as it is rotated in the brine 14. The outer diameter and length of the nozzles 19 depends upon the required degree of stirring and homogenization of the brine 14.

While a specific embodiment of the invention has been shown and described in detail to illustrate the application of the principles of the invention, it will be understood that the invention may be embodied otherwise without departing from such principles.

What is claimed is:

1. A method of dispersing a first liquid into a second liquid, comprising the steps of:
   (a) providing a vessel containing said second liquid;
   (b) providing first liquid injecting means in said second liquid having a hollow drum with a plurality of nozzles extending therefrom, each nozzle having an orifice of predetermined dimensioning at the end thereof spaced from an outer surface of the hollow drum by a predetermined spacing;
   (c) feeding said first liquid into the hollow drum and out through the orifice of each of the nozzles into said second liquid; and
   (d) rotating the hollow drum at a predetermined speed as said first liquid is fed into the hollow drum, such that the dimensioning of each orifice, the spacing of each orifice from the outer surface of the hollow drum and the predetermined speed of rotating of the hollow drum coact to forcibly break up the first liquid into droplets of small diameter which do not reunite with each other after leaving each orifice, without clogging of said each orifice.

2. A method according to claim 1, wherein said first liquid is a liquefied refrigerant which vaporizes after it comes into contact with said second liquid to cool said second liquid sufficient to crystallize a component of said first liquid.

3. A method according to claim 2, wherein the diameter of the droplets of said first liquid is no greater than 300 $\mu$m.

* * * * *

UNITED STATES PATENT OFFICE
CERTIFICATE OF CORRECTION

Patent No. 4,291,549     Dated September 29, 1981

Inventor(s) Fujimura; Yamamoto; Ogawa; Tanigawa

It is certified that error appears in the above-identified patent and that said Letters Patent are hereby corrected as shown below:

In Claim 2, last line, amend the wording "said first liquid" to read -- said second liquid --.

Signed and Sealed this

*Twenty-first* Day of *February 1984*

[SEAL]

Attest:

Attesting Officer

GERALD J. MOSSINGHOFF

*Commissioner of Patents and Trademarks*